(12) United States Patent
Edelman (10) Patent No.: US 8,861,119 B2
(45) Date of Patent: Oct. 14, 2014

(54) WRITE PRECOMPENSATION FOR HEAD MISALIGNMENT

(71) Applicant: Seagate Technology LLC, Cupertino, CA (US)

(72) Inventor: Harry S. Edelman, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/753,191

(22) Filed: Jan. 29, 2013

(65) Prior Publication Data
US 2014/0211339 A1 Jul. 31, 2014

(51) Int. Cl.
*G11B 5/09* (2006.01)
*G11B 5/54* (2006.01)

(52) U.S. Cl.
CPC .................................... *G11B 5/54* (2013.01)
USPC .................... 360/51; 360/42; 360/39; 360/55

(58) Field of Classification Search
None
See application file for complete search history.

(56) References Cited

U.S. PATENT DOCUMENTS

| 7,957,084 | B2 | 6/2011 | Chauhan et al. |
| 2010/0118433 | A1 | 5/2010 | Buch |
| 2010/0309576 | A1* | 12/2010 | Albrecht et al. ................ 360/75 |
| 2012/0194945 | A1 | 8/2012 | Gao |

* cited by examiner

*Primary Examiner* — Muhammad N Edun
(74) *Attorney, Agent, or Firm* — Holzer IP Law, PC (57) ABSTRACT

Misalignment of a transducer head over a bit-patterned media (BPM) may cause a bit to experience conflicting magnetization forces from the writer, resulting in improperly written data and stored data corruption. The likelihood of data corruption is reduced when a write transition is performed when the write sync margin is increased or maximized. Therefore, a write precompensation system may calculate time shift information for adjusting the timing of an individual write current transition at the transducer that compensates for write sync margin degradation due to any or all of skew angle of the transducer, track misregistration, and write field curvature.

20 Claims, 7 Drawing Sheets

WRITE PRECOMPENSATION FOR HEAD MISALIGNMENT

SUMMARY

Implementations described and claimed herein provide a timing adjustment for a write transition that compensates for write sync margin degradation attributable to skew angle, curvature, and/or track misregistration.

Other implementations are also described and recited herein.

DETAILED DESCRIPTION

In an effort to increase areal density of recording media, a magnetic recording layer is formed with an array of patterned cells, wherein each cell can hold a bit of data (e.g., bit patterned media (BPM)). With BPM, data is written to and read from the individual bits along a series of circular or nearly circular data tracks on a media (e.g., a magnetic disc) using a transducer on a head aligned with the data tracks.

A transducer typically has at least one write element (the "writer") and at least one read element (the "reader"). To write data to an individual data bit, the writer emits a magnetic field pulse sufficient to magnetize (i.e., "flip") the bit and orient it in a given direction. Ideally, a write transition to an individual data bit is performed when a write sync margin corresponding to that bit is maximized. The write sync margin is the distance that a write transition field line of the writer can shift in either direction at the time of a transition without causing an error to adjacent bits. Performing a write transition when the write sync margin is large can significantly decrease the likelihood of data corruption. However, several factors can cause misalignment of the transducer and thus degrade the write sync margin for a given transition.

For instance, the write sync margin can be degraded by cross-track misalignment of the transducer. An ideal transducer orientation is perpendicular to the data tracks and centered. The transducer, however, may drift from perfect cross-track alignment and consequently decrease the write sync margin corresponding to a bit at the time of a write transition of the writer.

The write sync margin can also be degraded by the skew angle of the transducer. Skew angle is an angle formed between the axis of the transducer and a tangent to a row of bits (also referred to herein as "dots") on the BPM. Skew angle causes the transducer head to tilt with respect to a row of bits, increasing the proximity between the magnetic field lines of the writer and a bit at a time of a transition to the bit.

Additionally, degradation of the write sync margin is influenced by the degree of curvature of the magnetic field lines unique to the writer which may curve toward each of the bits being written to.

The techniques disclosed herein may be used to calculate a timing adjustment for a write transition to reduce write sync margin degradation attributable to any or all of skew angle, track misregistration, and write field curvature. The methods employed may also be utilized to correct for other degradation effects to the write sync margin.

Figure 1:
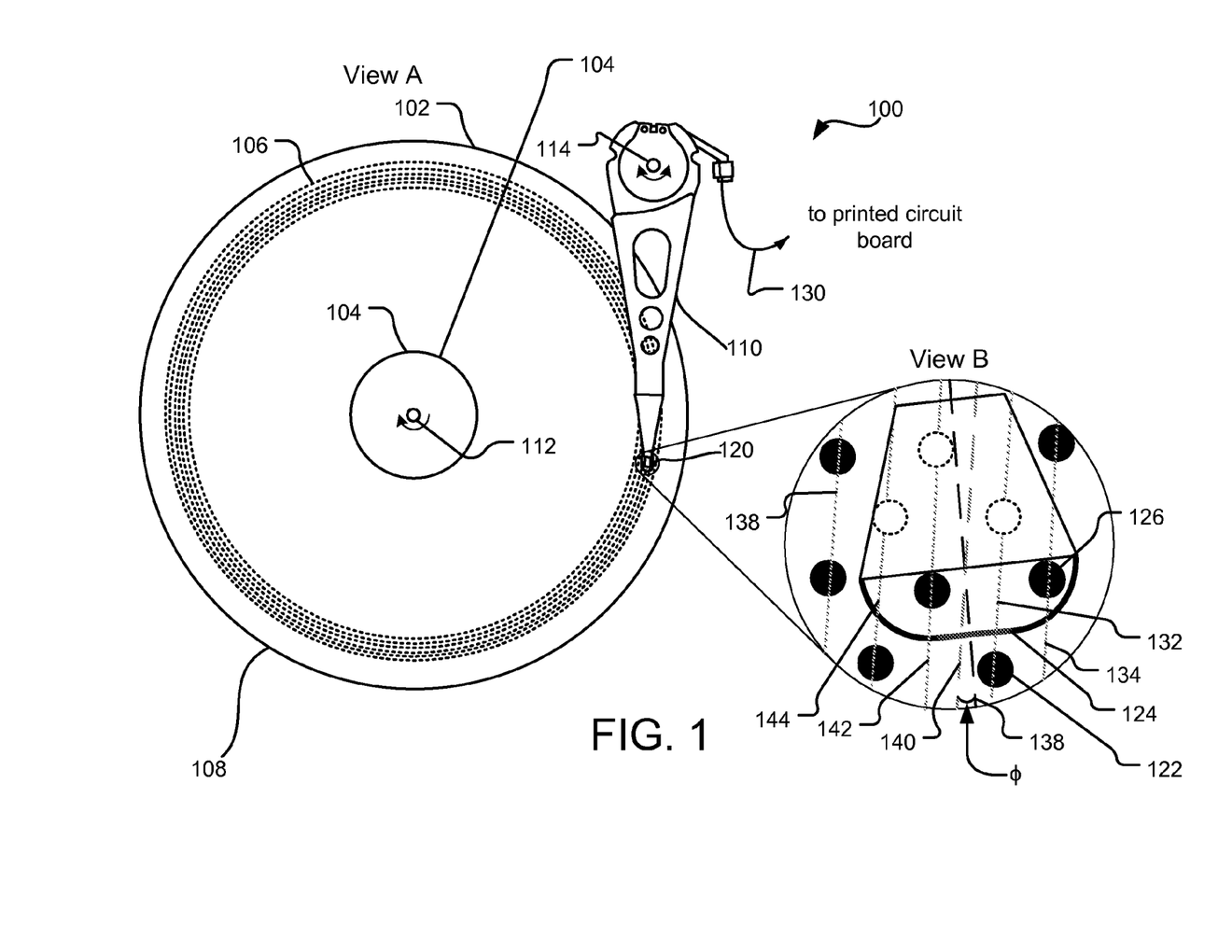
FIG. 1 illustrates a plan view of an example disc drive assembly including a transducer on a distal end of an actuator arm positioned over a bit patterned media disc with skew angle, write field curvature, and track misregistration (TMR) illustrated.

FIG. 1 illustrates a plan view of an example disc drive assembly 100 including a transducer 120 on a distal end of an actuator arm 110 positioned over a bit patterned media (BPM) disc 108. A rotary voice coil motor that rotates about actuator axis of rotation 114 is typically used to position the transducer on a data track and a spindle motor that rotates about disc axis of rotation 112 is used to rotate the media. Referring specifically to View A, the media 108 includes an outer diameter 102 and inner diameter 104 between which are a number of data tracks 106, illustrated by circular dotted lines. The data tracks 106 are substantially circular and are made up of regularly spaced patterned bits. In one implementation, the media 108 rotates at a constant high speed about disc axis of rotation 112 as information is written to and read from the data tracks 106 on the media 108. In another implementation, the media speed is variable.

Information may be written to and read from the patterned bits on the media 108 through the use of the actuator arm 110. The actuator arm 110 rotates about an actuator axis of rotation 114 during a seek operation to locate a desired data track on the media 108. The actuator arm 110 extends toward the media 108, and at the distal end of the actuator arm 110 is the transducer 120 on a head, which flies in close proximity above the media 108 while reading and writing data to the media 108. In other implementations, there is more than one transducer 120, actuator arm 110, and/or media 108 in the disc drive assembly 100.

A flex cable 130 provides the requisite electrical connection paths for the transducer head 120 while allowing pivotal movement of the actuator arm 110 during operation. The flex cable 130 connects a printed circuit board (PCB) (not shown) to the transducer head 120. The flex cable 130 routes along the actuator arm 110 from the PCB to the transducer head 120. The PCB typically includes circuitry for controlling the write currents applied to the transducer head 120 during a write operation and a preamplifier for amplifying read signals generated by the transducer 120 during a read operation.

The transducer 120 shown in View B of FIG. 1 is trapezoidal, but may be any one of a number of different shapes in different implementations. The transducer 120 includes a writer, a reader, bond pads, and data signal wires electrically connecting the writer and reader to the bond pads. The patterned bits (e.g., patterned bit 122) sequentially pass underneath the writer and reader as the media 108 rotates. Further, the patterned bits are shown in a staggered dot array; however, other patterned bits arrangements are contemplated. For instance, in one implementation, the patterned bits may be rectangular array. In another implementation, they may be in a hexagonal close-packed array.

The reader on the transducer 120 reads data from the patterned bits on the media 108 and the writer writes data to the patterned bits on the media 108. A data signal containing data to be written to the patterned bits is sent from the PCB, through the flex cable 130, and to the bond pads attached to the exterior of the transducer 120. The data signal is then sent to the writer via the data signal wires within the transducer 120.

The writer shown is configured to write to two dot rows at once (e.g., 132, 134). The writer emits a magnetic field pulse having a field line 124 of sufficient magnitude to perform a write transition to a given data bit. Ideally, the writer 118 writes data to the dot rows 132 and 134 on the same pass over the rows as the media rotates about axis 112. In writing data to each bit, write transitions of the writer 118 are precisely aligned with each respective bit passing below the writer. If the writer is misaligned during a write transition, then the corresponding misalignment of the write field pulse 124 can cause a bit to experience conflicting magnetization forces from the writer, resulting in improperly written data and stored data corruption.

The transducer 120 is oriented along an axis 138, which is plotted from the axis of rotation 114 to the transducer 120. When the skew angle is zero and the writer is perfectly positioned, the transducer follows an axis 140, which is parallel to the rows of dots (e.g., 132, 134). When the skew angle is non-zero (i.e., an angle φ as illustrated), the transducer axis 138 is not parallel to the dots rows (e.g., 132, 134). This slight tilt of the transducer 120 with respect to the dot rows may decrease the distance between a bit being written to (e.g., bit 122) and the field line 124 at the time of a transition, increasing the likelihood of error.

In operation, system vibrations may result in unwanted rotation of the head about the axis 114 (e.g., in the cross-track direction). This effect, known as track misregistration (TMR) can also contribute to writing errors and data corruption. Example error effects attributable to write field curvature, TMR, and skew are illustrated below with respect to FIGS. 2A-2D. The disc drive assembly 100 is configured to provide for a timing adjustment to a write field pulse that compensates for such effects.

Figure 2A:
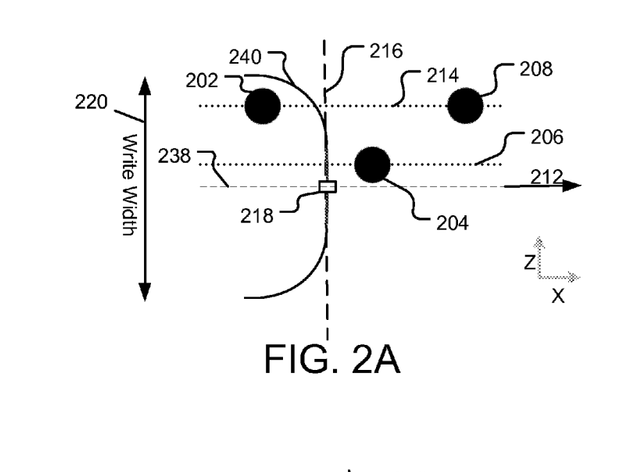
FIG. 2A illustrates a curved magnetic field line of a writer in relation to an example bit patterned media (BPM).

FIG. 2A illustrates a curved magnetic field line of a writer 218 in relation to an example bit patterned media (BPM). The writer 218 is positioned above an example bit-patterned media having two rows 206, 214 of bits in a staggered dot configuration. The media rotates below the writer 218 in a downtrack direction 212 (along the x-axis) while the writer 218 writes to bits in each of rows 206 and 214 on a single pass. An example magnetic field line 240 due to a transition of the writer 218 is shown. The field line 240 is of a minimal magnitude sufficient to cause a flip in bits to the left of the line 240 (e.g., bit 202). However, the magnitude of the field line 240 is also such that bits to the right of the field line 240 (e.g., bits 204 and 208) will not be flipped by the magnetic field line 240.

The write sync margin for the write transition to bit 202 is the distance between the center of bit 202 and the field line 240 along a line in the down-track direction 212. In other words, the write sync margin for the transition shown is the maximum distance that the field line 240 can shift in either direction along the x-axis without causing an error to be written to bit 202 or 204.

The write width 220 is the vertical distance along the cross-track (z-axis) direction wherein bits may be affected by the write transition illustrated in FIG. 2A. Data bits positioned below axis 238 may also affected the pass of the write head 218; however, transitions of bits below the axis 238 may be immaterial because such bits may be re-written correctly on a subsequent pass of the writer over an adjacent track (not shown).

Figure 2B:
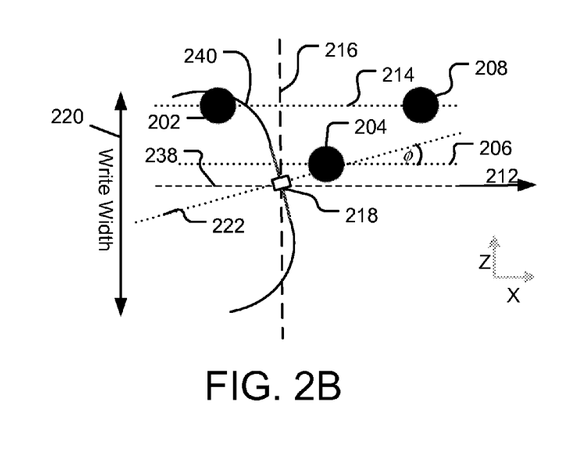
FIG. 2B illustrates a curved magnetic field line of a writer in relation to an example BPM, where the field line is affected by a skew angle of a transducer.
Figure 2C:
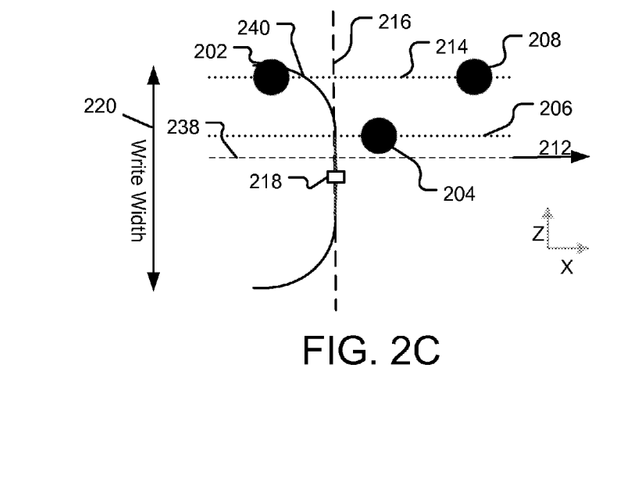
FIG. 2C illustrates a curved magnetic field line of a writer in relation to an example BPM, where the writer is displaced from a proper position along an axis in a cross-track direction.

FIGS. 2B and 2C show degradation effects to a write sync margin for a bit 202 due to skew angle and track misregistration in combination with field curvature. Each or all of these effects may be precompensated for by the implementations disclosed herein.

FIG. 2B illustrates a curved magnetic field line of a writer in relation to an example BPM, where the field line is affected by a skew angle of a transducer. Here, the skew angle (φ) is the angle between a dot row (e.g., dot row 206) on the BPM and transducer axis 222. Skew angle is determined dynamically by reading a track number on the BPM corresponding to one or more dot rows being written to.

The write sync margin for the transition to bit 202 in FIG. 2B is reduced as compared to the configuration of FIG. 2A because the skew angle of the transducer reduces the minimal distance between field line 240 and the center of the bit 202. Thus, the amount of permissible error in timing the write transition to bit 202 is reduced when the transducer head is skewed as illustrated.

FIG. 2C illustrates a magnetic field line of a writer in relation to an example BPM, where the writer 218 is displaced from a proper position along an axis 238 in the cross-track direction. This effect, referred to as track misregistration (TMR) degrades the write sync margin of the write transition for bit 202 in the same direction as a skewed orientation of the head (as illustrated by 2B). Here, the write sync margin is reduced as compared to the orientation of 2A because the misalignment of the writer 218 increases proximity between the curved field line 240 and the center of the bit 202.

The magnitude of a TMR can be calculated by known techniques. For instance, many magnetic recording media are patterned with dedicated servo burst patterns in order to provide feedback for maintaining the position of the head. In other systems, a readback signal from the transducer head is processed to indicate the off-track position of the head. Therefore, a TMR value can be dynamically ascertained during operation.

Figure 2D:
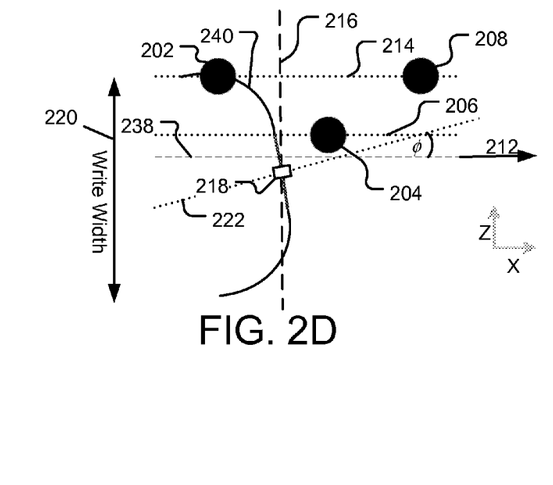
FIG. 2D illustrates a curved magnetic field line of a writer in relation to an example BPM, where the writer is displaced from a proper position along an axis in a cross-track direction, and the field line is affected by a skew angle of a transducer head.

FIG. 2D illustrates a magnetic field line 240 of a writer 218 in relation to an example BPM, where the writer is displaced from a proper position along an axis 238 in the cross-track direction, and the field line is affected by a skew angle (φ) of a transducer. In this case, the write sync margin corresponding to bit 202 is completely degraded and an error may occur in the write transition to the bit 202. It may be appreciated that the curvature of the field line 240 from the centerline of the writer 218 also inherently affects degradation of the write sync margin in each of FIGS. 2A-2D. For example, the greater the curvature of the field line 240, the smaller the write sync margin will be at a height aligned with the center of the bit 202.

The degradation to the write sync margin in each of the configurations shown by FIGS. 2A, 2B, 2C, and 2D can be reduced by the precompensation techniques disclosed in the implementations herein.

For efficient utilization of BPM capacity, it may be desirable for a write channel of the writer to precisely control the timing of the transitions in a data stream, such that the respective transitions coincide with the bits as they pass beneath the writer. BPM write precompensation may provide for a compensating shift to a write transition before the write transition enters the write channel. The shift introduced may be such that the transition arrives at the write head at a time when the write sync margin is increased or maximized as compared to the non-shifted transition.

As illustrated by FIGS. 2A-2D, skew, TMR, and field curvature all degrade the write sync margin in the downtrack direction. Therefore, a timing adjustment for the transition can be calculated that compensates for degradation to the write sync margin attributable to all or any combination of skew angle, write field curvature, and TMR.

Figure 3:
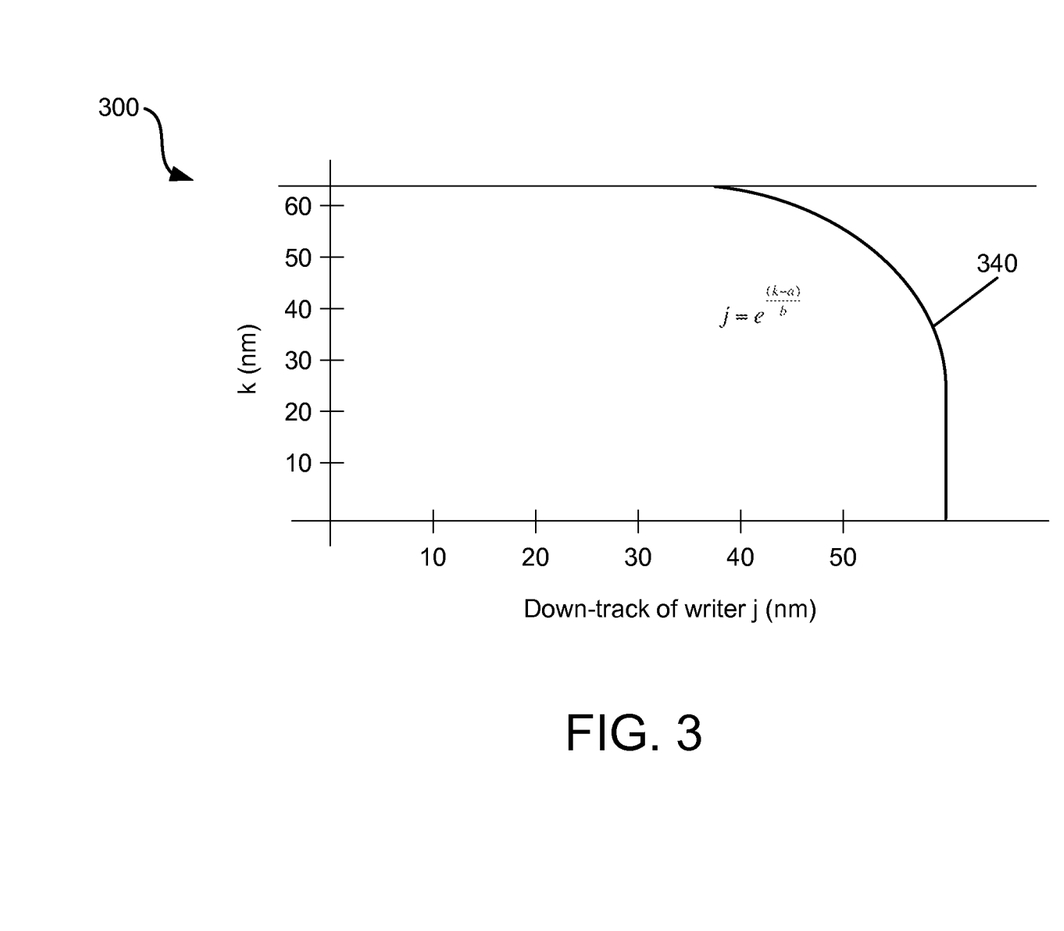
FIG. 3 illustrates an example field contour line fitted to a magnetic field line of a writer that is of sufficient magnitude to cause a bit flip in a BPM.

FIG. 3 illustrates an example curved field contour line 340 fitted to a magnetic field line of a writer that is of a sufficient minimal magnitude to cause a bit flip in a BPM. The j-axis of plot 300 represents the downtrack axis of the writer. To create the field line 340 shown, the centerline of the writer is positioned along the line k=0. The magnitude and curvature of the field line 340 is specific to each writer, and may, in one implementation, be modeled by the following equation:

$$j = e^{\frac{(k-a)}{b}}; \quad (1)$$

where a and b are constants which may be unique to each writer in each hard drive disk assembly.

Figure 4:
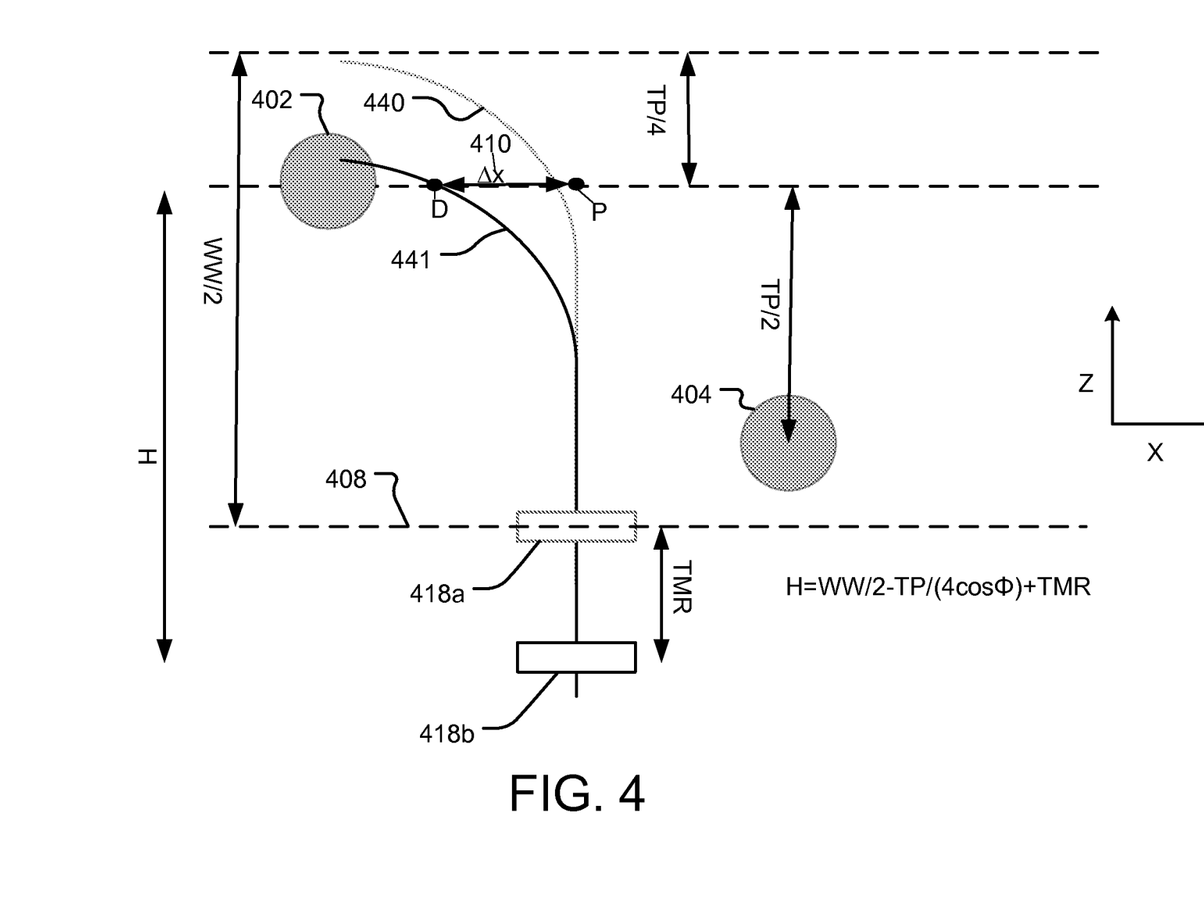
FIG. 4 illustrates one method of calculating a shift of a writer relative to a hypertrack staggered dot BPM that may compensate for write sync margin degradation attributable to skew angle, TMR, and curvature of the writer's magnetic field.

FIG. 4 illustrates one method of calculating a shift of a writer relative to a hypertrack staggered dot BPM that may reduce write sync margin degradation attributable to skew angle, TMR, and curvature of the writer's magnetic field. A writer 418a is shown properly positioned along an axis 408 where the skew angle of the transducer is zero. A field line 440, corresponding to the properly positioned writer 418a, is of sufficient minimal magnitude to cause a bit flip in bits underneath and to the left of the line 440 (e.g., bit 402) at a time of a transition. The magnitude of the field line 440 is also such that bits positioned to the right of the line 440 (e.g., bit 404) will not be flipped. A field line 441 corresponds to a second position of the writer 418b, and is identical to the line 440 but shifted by a distance TMR due to displacement of the writer 418b in the cross-track (z) direction. A shift Δx/2, where the distance Δx (410) is as illustrated, represents a shift of the BPM relative to the writer that compensates for field curvature and TMR and also preserves equal write sync margin for both of the bits 402 and 404.

As described above with reference to FIG. 3, the magnitude and curvature of the field line 441 corresponding to the displaced writer 418b may be modeled (e.g., by Equation (1)). Therefore, the coordinates of a point P may be ascertained, where the x-coordinate ($x_1$) of P corresponds with the x-coordinate of the field line 441 where it intersects the centerline of the writer 418b. Therefore, in an implementation where the field line 441 of the writer 418b is modeled by Equation 2 (below):

$$x = e^{\frac{(z-a)}{b}}, \quad (2)$$

the x-coordinate of point P ($x_1$) may be given by:

$$x_1 = e^{\frac{(-a)}{b}}. \quad (3)$$

The x-coordinate ($x_2$) of a corresponding point D along the displaced field line may therefore be determined by Equation 4 below, where D is at a height (H) from the writer 418b, and is aligned with the center of the bit 402:

$$x_2 = e^{\frac{(H-a)}{b}}; \quad (4)$$

where H is given by:

$$H = \frac{WW}{2} + TMR - \frac{TP}{4}; \quad (5)$$

and WW represents the write width of the writer, TMR is the cross-track displacement of the transducer, and TP is the track pitch. Track pitch is a convention defined by the geometry of the bit-patterned media, which corresponds to the width of the dot rows written to in a single pass. For instance, two dot rows are written to in a single pass in the hypertrack staggered dot array shown. Therefore, the distance between two adjacent rows of dots (e.g., the z-axis distance between dot 402 and dot 404) is equal to one half of the track pitch (TP/2). It should be understood that Equation (5) above is specific to the zero-skew scenario illustrated by FIG. 4.

Thus, in the zero skew scenario, a final shift $\Delta x_{final}$ (where $\Delta x_{final}$ is equal to one half of the Δx (410) illustrated in FIG. 4) that preserves equal write sync margin for both of the bits 402 and 404 is therefore:

$$\Delta x_{final} = \frac{(x1 - x2)}{2}; \quad (6)$$

where x1 is arrived at via Equation (3) above, and x2 is arrived via Equation (4) above. This shift reduces degradation of the write sync margin to bits 402 and 404 that is attributable to TMR and write field curvature.

In an identical scenario where the skew angle is non-zero (i.e., an angle ϕ, as illustrated and discussed with respect to FIGS. 1, 2B, and 2D), the final shift $\Delta x_{final}$ can be arrived at by accounting for the effects of skew angle of the writer on each of the terms discussed above with respect to Equations 2-6. For example, the shift $\Delta x_{final}$ may be calculated in the skewed coordinate system of the writer and projected into the unskewed coordinate system of the of the BPM by dividing by cos ϕ. Therefore, when the skew angle is non-zero, the shift $\Delta x_{final}$ which best preserves the write sync margin for dots 402 and 404 may be given by:

$$\Delta x_{final} = \frac{x'_1 - x'_2}{2\cos\phi}; \quad (7)$$

where x1' is a point in the skewed coordinate system of the writer that is given by:

$$x'_1 = e^{\frac{(-a)}{b}}, \quad (8)$$

φ is the skew angle of the transducer, a and b are constants unique to the writer, and x2' is given by is given by Equation (9), below:

$$x'_2 = e^{\frac{(H-a)}{b}}; \quad (9)$$

where H is given by:

$$H = \frac{WW}{2} + TMR - \frac{TP}{4\cos\phi}; \quad (10)$$

for which all terms (except track pitch (TP)) are measured in the skewed coordinate system of the writer. In this implementation, the shift $\Delta x_{final}$ (as given by Equation (7)) compensates for the effects of field curvature, TMR, and skew angle on the write sync margin of bits 402 and 404.

Finally, a timing shift Δt can be computed that adjusts the timing of the transition such that the transition is performed when the field line 441 is effectively shifted relative to the BPM by the amount $\Delta x_{final}$, as given by Equation (7) above.

This disclosure is in no way limited to the specific methods discussed above with respect to FIGS. 3-4. Rather, the methods of precompensation discussed above in association with FIGS. 3-4 are meant to provide example implementations of precompensation techniques that account for degradation of the write sync margin due to skew angle, write field curvature, and/or TMR. It may be understood that substantially the same or similar methods may be applied to BPM having different array configurations. For instance, the above methodology may also apply to BPM having a rectangular bits.

Figure 5:
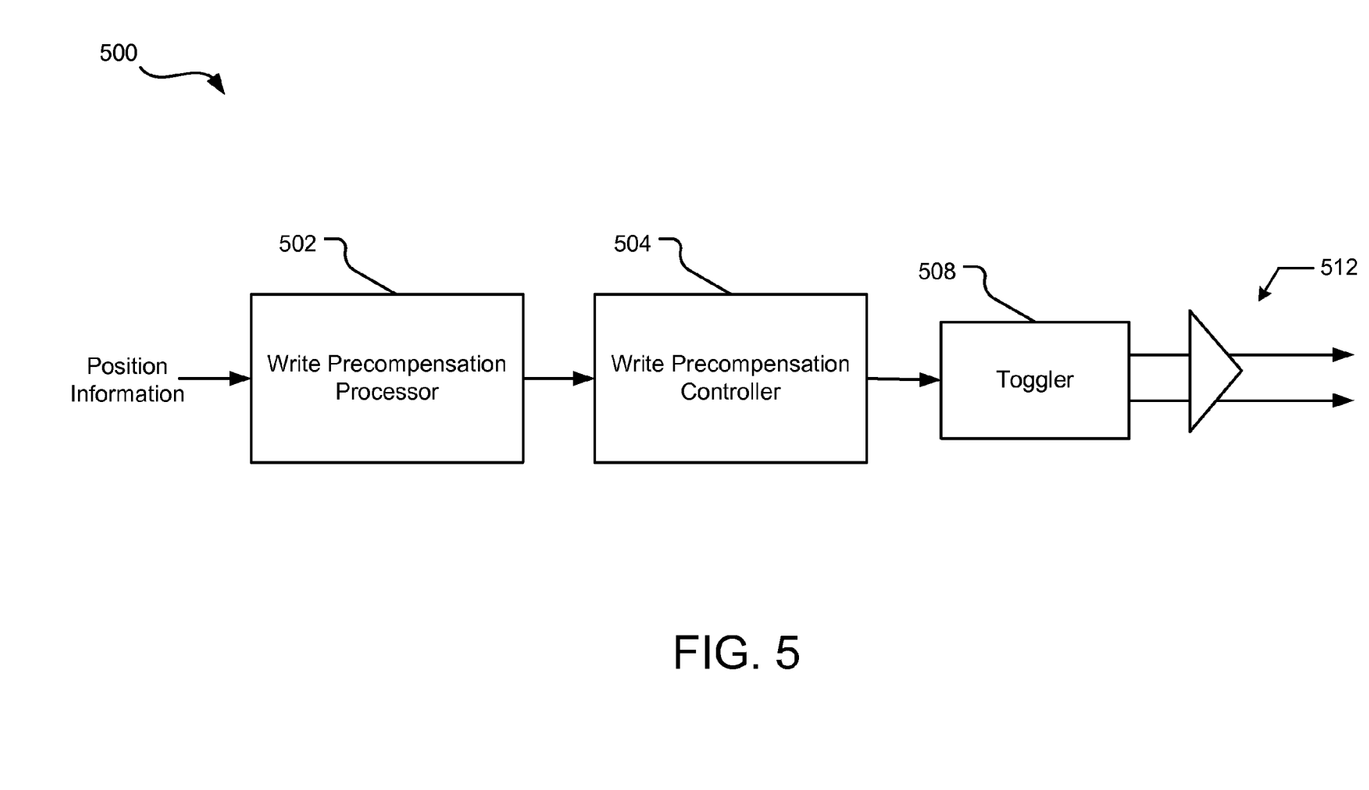
FIG. 5 is an example system for implementing a timing adjustment for a write transition that corrects for write sync margin degradation attributable to skew angle, track misregistration, and/or write field curvature.

FIG. 5 is an example system 500 for implementing a timing adjustment for a write transition that corrects for write sync margin degradation attributable to skew angle, track misregistration, and/or write field curvature. The system 500 provides BPM write precompensation to respective write transitions of the writer. Write precompensation processor 502 calculates a timing adjustment for a transition that decreases degradation to the write sync margin attributable to skew angle, TMR, and write field curvature. This calculation may be performed according to the implementations described with respect to FIGS. 3-4; however, it may also be performed according to other methods that serve to increase the write field margin for the given transition.

As a reader positioned on a transducer reads position information from data bits along a given data track, head position information (which may include TMR and skew angle) is continuously passed to a write precompensation processor 502. Using the head position information, the write precompensation processor 502 determines an original position of a bit relative to a writer for a transition time when a write transition is schedule to occur. The write processessor 502 then calculates a timing adjustment which may move the transition to an earlier point in time when the write sync margin is greater than it would be at the transition time.

The precompensation processor 502 may also take into account timing adjustments that correct for delays inherent in the precompensation process. In one implementation, the precompensation processor 502 calculates expected delays associated with operations of respective channel components in processing the write transition. The processor calculates a timing shift for the write transition that compensate for the delays that the transition is expected to incur as the signal is processed by the channel.

In one implementation, the timing shift based on the position information is calculated in the write channel. In another implementation, the timing shift based on the position information is calculated before entering the write channel and is supplied to the precompensation processor in the channel.

A write precompensation controller 504 then applies the time shift to the transition. In the example illustrated in FIG. 5, the controller receives a signal from a write clock and the timing shift information from the precompensation processor and provides shifted write transitions over respective output lines 512 to a write current driver of a preamplifier (not shown).

Figure 6:
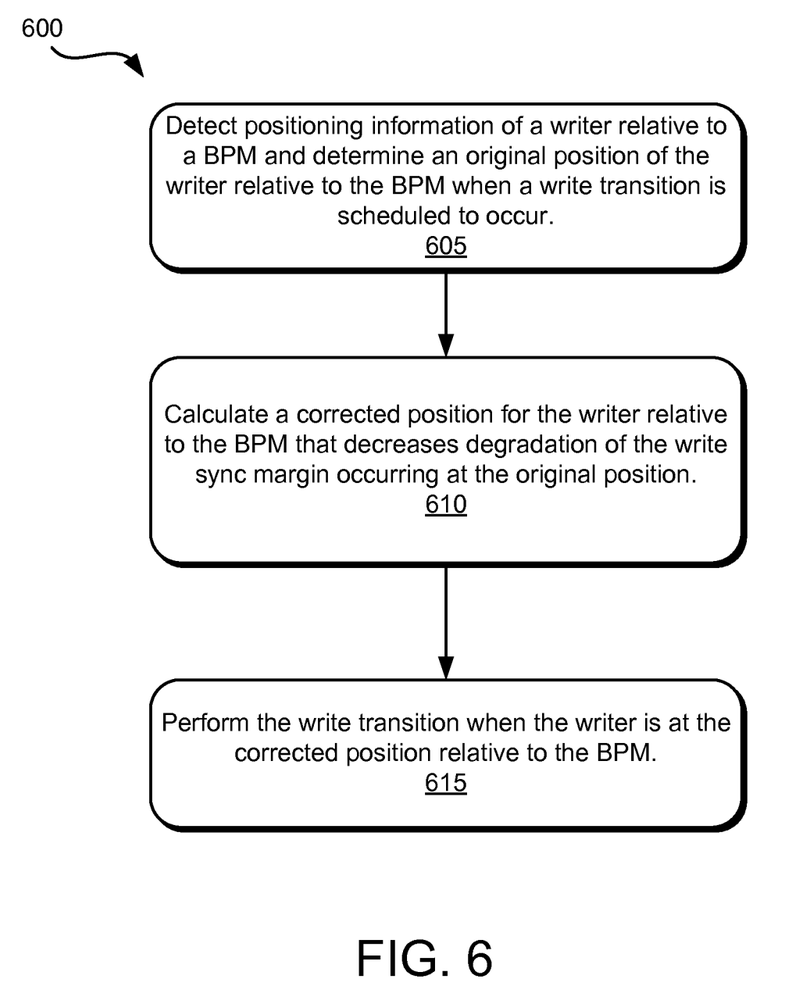
FIG. 6 illustrates example dynamic precompensation operations for a write transition that corrects for degradation effects due to skew angle, write field curvature, and/or TMR.

FIG. 6 illustrates example dynamic precompensation operations 600 for a write transition that corrects for degradation effects due to skew angle, write field curvature, and/or TMR. As bits associated with a data track of a BPM rotate beneath a transducer head having one or more position sensors, a detection operation 605 detects positioning information of a writer relative to a BPM and determines an original position of the writer relative to the BPM when a write transition is to occur. For example, the original position may be based on positioning information including a skew angle of the head or a TMR offset at the scheduled transition time that is detected or computed based on read sensor signals or servo pattern information passed to a processor.

A processing operation 610 then calculates a shift of the writer from the original position to a corrected position, where the shift is such that the write transition at the corrected position provides for a greater write sync margin for the bit transition as compared to the margin at the original position. The shift may compensate for one or more degradation effects of the write sync margin attributable to any combination of skew angle, TMR, and write field curvature. The processing operation 610 calculates a timing adjustment based on the shift such that the transition may be performed when the writer is at the corrected position relative to the BPM. A transition operation 615 applies the timing adjustment and performs the transition at an earlier time so that the write margin for the transition is increased.

Figure 7:
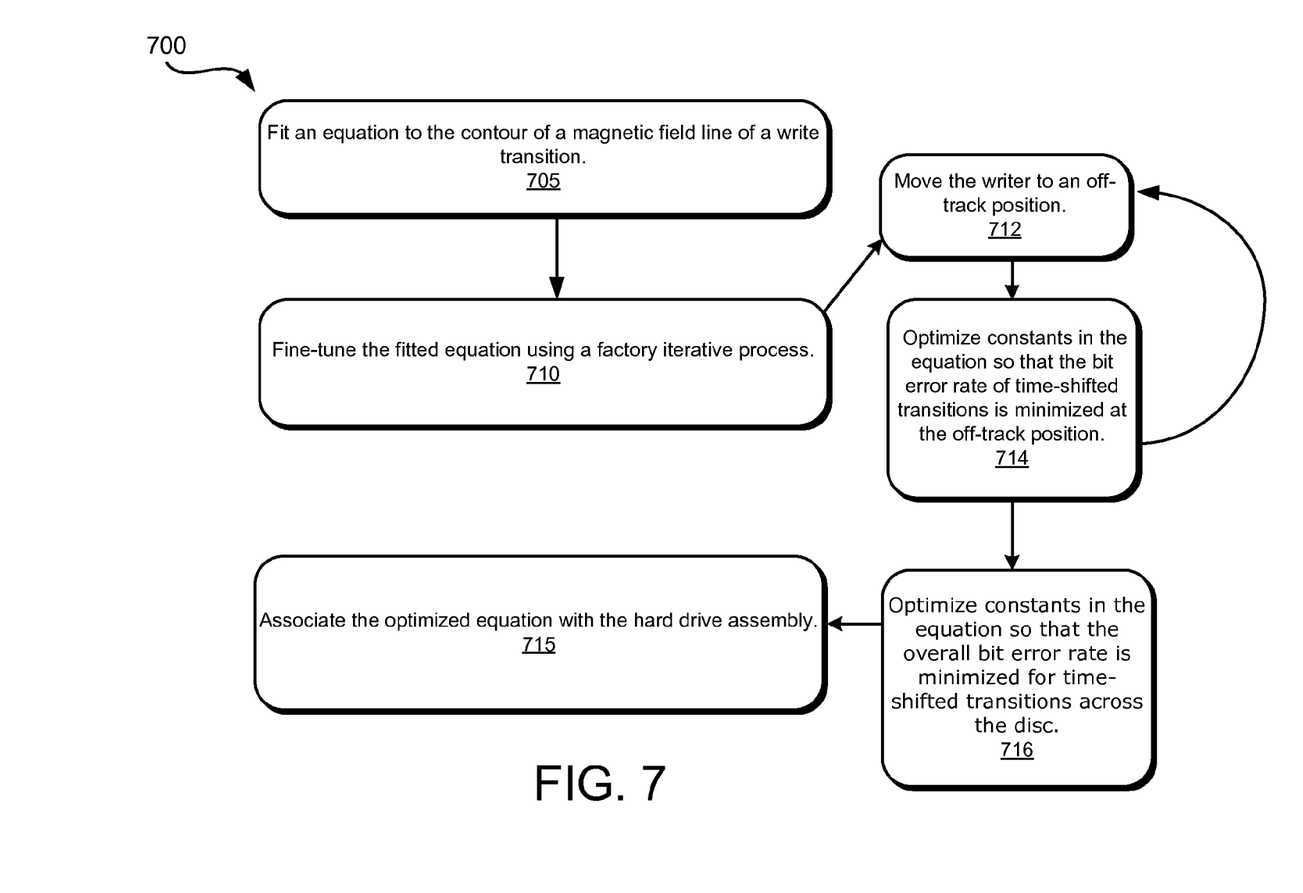
FIG. 7 illustrates example operations for calibrating a hard drive disk to implement a method of precompensation that corrects for skew angle, write field curvature, and/or TMR.

FIG. 7 illustrates example operations 700 for calibrating a hard drive disk to implement a method of precompensation that corrects for skew angle, write field curvature, and/or TMR. A fitting operation 705 fits a contour curve to a magnetic field line of a writer to be used in a hard drive disk assembly. In one implementation, the contour line is fitted to a magnetic field line of the writer that is of minimal magnitude sufficient to cause a bit flip in response to a magnetic field pulse emitted by the writer. The contour line equation that satisfies the fit to the writer's magnetic field line may be provided with the writer to a factory and used in performing calibration procedures on the hard drive disk assembly.

A calibration fine-adjustment fitting operation 710 fine-tunes the contour line equation so that the equation can be used to calculate timing shifts that maximize the write sync margin for a number of transitions. The calibration fitting operation 710 may be performed at a factory via an iterative process which determines the best values for one or more constants present in the contour line equation. For example, if the contour line equation is given by $$x = e^{\frac{(z-a)}{b}}$$

where a and b are constants (as discussed with respect to FIGS. 3-4), then the timing of a transition can be adjusted based upon a shift of the optimized contour line (Δx). Thus, the fitting operation 710 may optimize values of the constants a and b so that the precompensation shifts Δt, calculated based on Δx, best maximize write sync margins for transitions at all positions on the media. In one implementation, the optimization fitting operation 710 may be performed for a variety of positions having a zero skew angle, where resolution is highest.

During the factory iterative fine-tune fitting operation 710, the writer is moved to an off-track position in moving operation 712. The transducer head provides position information to a precompensation processor, and the precompensation processor uses the position information to calculate a field line shift for a transition at the off-track position of the writer. The field line shift is converted to a precompensation time value, and a precompensation controller adjusts the timing of the write transition by a time equal to the precompensation time value. When the transition is performed, a bit error rate associated with the time-adjusted write transition is measured. During optimization operation 714, constants (e.g., a and b) in the field line equation are repeatedly altered for the same off-track position, and the bit error rate is measured for the associated precompensation shift until optimal values are determined for the single off-track position.

In moving operation 712, the writer is placed at another off-track position and the optimization operation 714 is repeated for that position, another position, and so on for a multitude of positions on the BPM until the contour field line equation is optimized such that precompensation shifts calculated based on the contour field line equation yield the lowest overall bit error rate. Therefore, in one implementation, the contour field line equation is optimized when optimal values for constants such as 'a' and 'b' are determined.

An example association operation 715 associates the optimized field line shift equation with the hard drive disk assembly such that the optimized field line shift equation can be dynamically referenced in response to a read signal and utilized to calculate precompensation timing adjustments that best decrease the bit error rate (by maximizing the write sync margin) for each respective transition of the writer.

The implementations of the invention described herein are implemented as logical steps in one or more computer systems. The logical operations of the present invention are implements (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, adding and omitting operations as desired, unless explicitly claimed otherwise or a specific order is inherently necessitated by the claim language.

The above specification, examples, and data provide a complete description of the structure and use of exemplary implementations of the invention. Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A method comprising:
    calculating a distance between a first point on a target magnetic field line and a second point on a shifted magnetic field line, the shifted magnetic field line being offset from the target magnetic field line due to a skew angle of a transducer; and
    determining an adjustment to write signal timing to increase a write sync margin based on the calculated distance.

2. The method of claim 1, wherein the write sync margin is between a write field of the transducer and a bit on the media.

3. The method of claim 2, wherein the media is a bit-patterned media comprising rectangular bits.

4. The method of claim 2, wherein the media is a bit-patterned media comprising at least one of a staggered dot array and a hexagonal close-packed array.

5. The method of claim 1, wherein the target magnetic field line extends from the transducer at a target position and the shifted magnetic field line extends from the transducer at a shifted position.

6. The method of claim 1, wherein a center of a target data bit is along an axis that passes through both the first point and the second point.

7. The method of claim 1, wherein the shifted magnetic field line is offset from the target magnetic field line due to a combination of track misregistration of the transducer and the skew angle of the transducer.

8. The method of claim 1, further comprising:
    detecting the transducer at a shifted position associated with the shifted magnetic field line.

9. A system comprising:
    a transducer; and
    a write precompensator that receives head position information from the transducer and determines an adjustment to write signal timing to increase a write sync margin based on a distance between a first point on a target magnetic field line and a second point on a shifted magnetic field line, the shifted magnetic field line defined by the head position information and offset from the target magnetic field line due to a combination of skew angle and track misregistration of the transducer.

10. The system of claim 9, wherein the target magnetic field line extends from the transducer at a target position and the shifted magnetic field line extends from the transducer at a shifted position.

11. The system of claim 9, wherein the transducer is configured to detect position information.

12. The system of claim 11, wherein the write precompensator is configured to receive the position information from the transducer at the shifted position.

13. The system of claim 12, wherein the write precompensator is further configured to calculate a shift of a write field of the transducer based on the position information.

14. The system of claim 11, wherein the media is a bit-patterned media comprising rectangular bits.

15. The system of claim 11, wherein the media is a bit-patterned media comprising at least one of a staggered dot array and a hexagonal close-packed array.

16. The system of claim 11, wherein the precompensator adjusts the write signal timing based on a TMR value detected by the transducer wherein a center of a target data bit is along an axis that passes through both the first point and the second point.

17. One or more non-transitory computer-readable storage media encoding computer-executable instructions for executing on a computer system a computer process, the computer process comprising:
- calculating a distance between a first point on a target magnetic field line and a second point on a shifted magnetic field line, the shifted magnetic field line being offset from the target magnetic field line due to a skew angle of a transducer; and
- determining a write signal timing adjustment to increase a write sync margin based on the calculated distance.

18. The one or more computer-readable storage medium of claim 17, wherein the shifted magnetic field line is offset from the target magnetic field line due to a combination of track misregistration and the skew angle of the transducer.

19. The one or more computer-readable storage medium of claim 17, wherein the write sync margin is between a write field of the transducer and a bit on the media.

20. The one or more computer-readable storage medium of claim 17, wherein
- a center of a target data bit is along an axis that passes through both the first point and the second point.

* * * * *